United States Patent [19]

Ball et al.

[11] Patent Number: 4,638,865
[45] Date of Patent: Jan. 27, 1987

[54] BIORESISTANT WATER-SOLUBLE ALKYL SUBSTITUTED ACRYLAMIDE POLYMERS AND ENHANCED OIL RECOVERY METHOD EMPLOYING SAME

[75] Inventors: Lawrence E. Ball, Akron; William M. Griffin, Chesterland; Kathleen M. Wallace, Chardon; Amy L. Nemecek, Garfield Heights, all of Ohio

[73] Assignee: The Standard Oil Company, Cleveland, Ohio

[21] Appl. No.: 739,478

[22] Filed: May 30, 1985

[51] Int. Cl.$^4$ .............................................. E21B 43/16
[52] U.S. Cl. ................................... 166/274; 523/130; 526/307.6; 252/8.514; 252/8.512; 252/8.554
[58] Field of Search ................. 526/307.6; 252/8.5 A, 252/8.5 LC, 8.55 D; 166/274; 523/130

[56] References Cited

U.S. PATENT DOCUMENTS

| | | | |
|---|---|---|---|
| 3,039,529 | 6/1962 | McKennon | 166/9 |
| 3,804,173 | 4/1974 | Jennings | 252/8.55 D |
| 4,409,110 | 10/1983 | Borchardt et al. | 252/8.55 |
| 4,423,199 | 12/1983 | Chang | 526/307.6 |
| 4,439,332 | 3/1984 | Frank | 523/336 |

OTHER PUBLICATIONS

Pusher Oil Recovery Polymers, Pusher 500 Polymers, The Dow Chemical Company, 1980, form No. 192-78-6-80.
Pusher Oil Recovery Polymers, Pusher 700 Polymers, The Dow Chemical Company, 1980, form No. 192-78-7-80.
Pusher Oil Recovery Polymers, Pusher 1000, The Dow Chemical Company, form No. 173-926-75.

Primary Examiner—Paul R. Michl
Attorney, Agent, or Firm—Larry W. Evans; David J. Untener; William A. Heidrich

[57] ABSTRACT

A polymer is disclosed which is represented by the formula

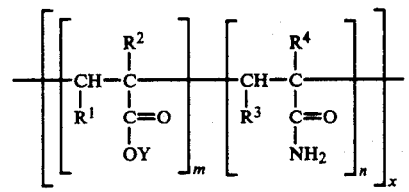

wherein: Y is hydrogen, ammonium, an alkali metal or an alkaline earth metal; $R^1$ and $R^3$ are independently hydrogen or alkyl groups of 1 to about 3 carbon atoms; $R^2$ is hydrogen or an alkyl group of 2 to about 3 carbon atoms, and $R^4$ is hydrogen or an alkyl group of 1 to about 3 carbon atoms, with the proviso that $R^2$ is not the same as $R^4$ and either $R^2$ or $R^4$ is hydrogen; m is a number sufficient to provide the acid or salt portion of said polymer at a level of from about 10% to about 90% by weight of the total weight of said polymer; n is a number sufficient to provide the amide portion of said polymer at a level of from about 10% to about 90% by weight of the total weight of said polymer; and x is a number sufficient to provide said polymer with a molecular weight of at least about 100,000. A method for recovering oil from a subterranean formation comprising injecting into said formation an aqueous composition comprising a thickening amount of the foregoing polymer is also disclosed.

21 Claims, No Drawings

BIORESISTANT WATER-SOLUBLE ALKYL SUBSTITUTED ACRYLAMIDE POLYMERS AND ENHANCED OIL RECOVERY METHOD EMPLOYING SAME

TECHNICAL FIELD

This invention relates to novel bioresistant polymers and to the recovery of oil from subterranean formations using said polymers. More particularly, this invention relates to bioresistant, water-soluble alkyl-substituted acrylamide polymers and their use as thickeners in enhanced oil recovery waterflooding operations.

BACKGROUND OF THE INVENTION

In the recovery of oil from oil-bearing subterranean formations, it usually is possible to recover only minor portions of the original oil in place by the so-called primary recovery methods which utilize only the natural forces present in the formation. A variety of supplemental recovery techniques have been employed in order to increase the recovery of oil from subterranean formations. The most widely used supplemental recovery technique is waterflooding which involves the injection of water into the formation. As the water moves through the formation, it acts to drive oil therein toward a production system composed of one or more wells through which the oil is recovered.

It has long been recognized that factors such as the relative mobilities of the oil in the formation and injected water influence the amount of oil recovered by waterflooding. Viscosifiers such as polymeric thickeners are commonly added to all or part of the injected water in order to increase the viscosity thereof, thus decreasing the mobility ratio between the injected water and oil and improving the sweep efficiency of the waterflood. Examples of such polymeric thickeners include the polyacrylamides and partially hydrolyzed polyacrylamides. See, for example, U.S. Pat. Nos. 2,827,964; 3,039,529; 3,853,802; 4,249,608; 4,326,969; and 4,409,110. Examples of commercially available hydrolyzed polyacrylamides that are useful as thickeners for waterflooding are the "Pusher" chemicals marketed by the Dow Chemical Company.

A significant problem with respect to many of the commercially available polymeric thickeners relates to their lack of resistance to attack by microorganisms that grow in the floodwater and possibly in the subterranean formation. These microorganisms use the polymeric thickeners as food and thereby destroy their useful properties. Thus far the solution to this problem has been to add a biocide additive to the floodwater to prevent the growth of such microorganisms. Examples of such additives include formaldehyde and glutaraldehyde. The patent literature suggests other additives can also be used. For example, U.S. Pat. Nos. 2,205,558, 3,394,195, and 3,407,204 disclose the use of maleimides; U.S. Pat. No. 3,562,157 discloses the use of malealdehyde; and U.S. Pat. No. 4,049,559 discloses the use of certain di-bicyclo or heptyl or di-bicyclo and heptenyl polyamines. These biocide additives are, however, usually too costly to be used economically. They can also cause plugging in the well if they are not thoroughly mixed in the floodwater. A critical problem with the use of these biocide additives relates to the fact that they tend to separate from the polymeric thickener as they advance through the formation and thus the effectiveness of the additive in protecting the thickener is reduced or lost. The reason for such separation is believed to be due to the fact that the rate of adherence to the rock in the formation for such biocide additives is different than for the polymeric thickeners and thus the rate of advance through the formation for each is different.

An additional problem with the use of many of the commercially available thickeners relates to providing a thickener that is stable and effective in environments characterized by temperatures of from about 15° C. to about 120° C. and above, high pressures (e.g., up to about 4000 psi), high concentrations of divalent or trivalent metal ions such as calcium, magnesium, boron, barium, iron, etc. (e.g., up to 3000 ppm or more and in some instances as high as 10,000 or 20,000 ppm), high salinity (e.g., total dissolved salts (TDS) levels of up to about 200,000 ppm), and low or high pH (e.g., pH as low as about 4 and as high as about 12). Some of these thickeners undergo a marked decrease in viscosity at relatively high temperatures and therefore are not sufficiently thermally stable for use in oil fields having relatively high temperatures. Many are also relatively difficult to inject, have a relatively low tolerance to divalent and/or trivalent metal ions, and/or have poor shear stability.

It would be advantageous to provide a polymeric thickener that would, in itself, be biologically resistant. By providing such a polymer, the problem of separation of the polymer from any biocide additive would be inherently overcome. It would also be advantageous if this thickener could be effectively used in waterflooding operations wherein the polymer would be exposed to high temperatures, high salinities, high pressures, high concentrations of divalent and/or trivalent metal ions, and/or high or low pH.

SUMMARY OF THE INVENTION

The present invention contemplates the provision of a water-soluble, biologically resistant polymer that is useful as a thickener in waterflooding operations. These polymeric thickeners are useful when exposed to temperatures of from about 15° C. to about 120° C. and above, high salinities, high pressures, high concentrations of divalent and/or trivalent metal ions, and high or low pH. These polymeric thickeners inherently overcome the problem of separation from additional biocide additives because the polymer, is in itself, bioresistant.

Broadly stated, the present invention provides for a water-soluble, bioresistant polymer containing amide, and acid or salt portions represented by the formula

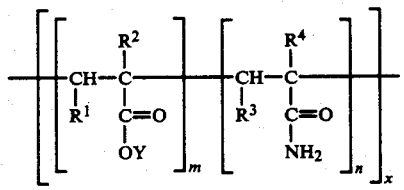

wherein: Y is hydrogen, ammonium, an alkali metal or an alkaline earth metal; $R^1$ and $R^3$ are independently hydrogen or alkyl groups of 1 to about 3 carbon atoms; $R^2$ is hydrogen or an alkyl group of 2 to about 3 carbon atoms, and $R^4$ is hydrogen or an alkyl group of 1 to about 3 carbon atoms, with the proviso that $R^2$ is not the same as $R^4$ and either $R^2$ or $R^4$ is hydrogen; m is a number sufficient to provide the acid or salt portion of said polymer at a level of from about 10% to about 90% by weight of the total weight of said polymer; n is a number sufficient to provide the amide portion of said polymer at a level of from about 10% to about 40% by weight of the total weight of said polymer; and x is a number sufficient to provide said polymer with a molecular weight of at least about 100,000.

The invention further provides for a method for recovering oil from a subterranean formation comprising injecting into said formation an aqueous composition comprising a thickening amount of the foregoing polymer.

DESCRIPTION OF THE PREFERRED EMBODIMENTS

The water-soluble, bioresistant polymers that are provided in accordance with the invention are represented by the formula

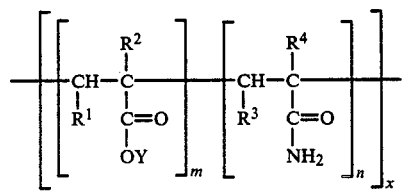

wherein Y is hydrogen, ammonium, an alkali metal or an alkaline earth metal; $R^1$ and $R^3$ are independently hydrogen or alkyl groups of 1 to about 3 carbon atoms; $R^2$ is hydrogen or an alkyl group of 2 to about 3 carbon atoms, and $R^4$ is hydrogen or an alkyl group of 1 to about 3 carbon atoms, with the proviso that $R^2$ is not the same as $R^4$ and either $R^2$ or $R^4$ is hydrogen; m is a number sufficient to provide the acid or salt portion of said polymer at a level of from about 10% to about 90% by weight of the total weight of said polymer, preferably from about 10% to about 50%, more preferably about 30%; n is a number sufficient to provide the amide portion of said polymer at a level of from about 10% to about 90% by weight of the total weight of said polymer, preferably from about 50% to about 90%, more preferably about 70%; and x is a number sufficient to provide said polymer with a molecular weight of at least about 100,000. Y is preferably an alkali metal, more preferably sodium. $R^1$ and $R^3$ can be the same or different and preferably each is hydrogen. In a preferred embodiment, $R^1$, $R^2$ and $R^3$ are each hydrogen, and $R^4$ is an alkyl group of 1 to about 3 carbon atoms, preferably $R^4$ is methyl. In another preferred embodiment $R^1$, $R^3$ and $R^4$ are each hydrogen and $R^2$ is an alkyl group of 2 to about 3 carbon atoms. These polymers preferably have a molecular weight of at least about 1,000,000, more preferably from about 1,000,000 to about 10,000,000, more preferably from about 3,000,000 to about 7,000,000.

In a preferred embodiment, these polymers are copolymers derived from methacrylamide and an alkali metal (preferably sodium) salt of acrylic acid, said copolymers having a molecular weight of at least about 100,000, preferably at least about 1,000,000, a methacrylamide content of from about 10% to about 90% by weight and a salt content of from about 10% to about 90% by weight.

While not wishing to be bound by theory, it is believed that the bioresistant properties of the polymers of the invention are a result of steric hindrance created by the presence of the $R^2$ and $R^4$ groups and the differences in structure of these groups. Thus a critical feature of the invention is the presence of $R^2$ and $R^4$ and the fact that they are not equal to each other.

The water-soluble, bioresistant polymers of the invention are preferably prepared by polymerizing the required amide monomer, and acid or salt monomer. Polymerization preferably occurs by free radical polymerization of the monomers in water, although precipitation or inverse emulsion polymerization techniques can also be used. Free radical polymerization in water can be accomplished by charging the monomers and water to a suitable vessel, purging the system of residual oxygen with a stream of an inert gas such as nitrogen, followed by initiation with a free radical catalyst. The polymerization reaction is preferably conducted by raising the temperature of the reaction mixture to the decomposition temperature of the catalyst and allowing the polymerization to proceed to the desired conversion. Agitation may be employed to assist in heat transfer since the reaction is exothermic.

The catalyst can be any free radical catalyst suitable for making polyacrylamide, with the persulfates, peroxides, or azo catalysts being preferred. Catalysts that are particularly useful are the salts of persulfate such as ammonium, sodium, or potassium. These particular systems are capable of redox reactions to provide a wide range of operating temperatures. A preferred polymerization temperature is between about 0° C. and about 100° C. although temperatures of above about 40° C. are more preferred. Advantageously the polymerization temperature is in the range of about 60° C. to about 80° C.

The concentration of monomers in the water solutions is preferably in the range of about 1% to about 20% by weight. Higher concentrations can be used but the resulting product is usually in the form of a viscous, non-flowing gel which is inconvenient for further use. The choice of monomer concentration is usually determined by the desired viscosity characteristics of the ultimate product solution.

The ratio of amide monomer to acid or salt monomer is preferably at the level necessary to provide the desired polymer product. The time of the reaction is dependent upon the rate of polymerization and the desired yield. The rate is determined by the choice of catalyst and the monomer concentration. Normally a high yield (90% or greater) is desired for commercial production and the time is chosen based on the above conditions and the capabilities of the equipment, especially as to heat removal. The polymerization is generally unaffected by pressure. Normally a slight over-pressure of the inert gas is employed to assure that atmospheric oxygen is constantly excluded from the reaction.

The resulting polymer-containing solution, which generally has a relatively high viscosity, may be utilized for enhanced oil recovery applications by merely diluting the solution with additional water to the desired concentration. Alternatively, the polymer may be recovered by precipitation with a suitable non-solvent such as acetone or a lower alcohol (e.g., methanol). In the latter case, the polymer is preferably shipped to the point of application in the form of a dry powder and then redissolved for use in the field. Since the polymers of the invention are bioresistant, no special treatment in the field is required other than insuring that the polymer is completely dissolved in the floodwater.

The amide monomers that are useful in preparing the polymers of the invention are preferably represented by the formula

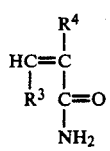

wherein $R^3$ and $R^4$ are independently hydrogen or alkyl groups of 1 to about 3 carbon atoms. The amide monomer is preferably acrylamide or methacrylamide, with the selection of said monomer being dependent upon the particular acid or salt monomer employed since $R^2$ cannot be the same as $R^4$ and either $R^2$ or $R^4$ must be hydrogen.

The acid or salt monomers that are useful are preferably represented by the formula

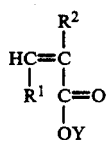

wherein $R^1$ is hydrogen or an alkyl group of 1 to about 3 carbon atoms, and $R^2$ is hydrogen or alkyl groups of 2 to about 3 carbon atoms; Y is hydrogen, ammonium, an alkali metal (e.g., sodium or potassium) or an alkaline earth metal (e.g., calcium or magnesium). Sodium acrylate is preferred.

The following examples are provided for the purpose of further illustrating the present invention. Unless otherwise indicated, in the following examples as well as throughout the specification and in the claims, all parts and percentages are by weight, and all temperatures are in degrees centigrade.

EXAMPLE 1

An 8-ounce polymerization bottle was charged with 7.5 grams of methacrylamide, 2.5 grams of acrylic acid, 90.0 grams of distilled water, and 1.0 ml. of 0.4% potassium persulfate solution. The pH was set at 8-10 by addition of NaOH. The polymerization bottle was purged with nitrogen gas, sealed and placed in a tumbling water bath having a temperature of 60° C. for 4 hours. The resulting product solution was added to an excess of acetone to precipitate a polymeric product. Purification to remove residual monomers was accomplished using soxhlet extraction for 24 hours using methanol as the extraction solvent. Filtration and vacuum drying followed. Elemental analysis of the polymeric product indicated a nitrogen content of 11.83%, a carbon content of 44.80%, a hydrogen content of 7.34%, a methacrylamide content of 74.7% by weight and a sodium acrylate content of 25.3% by weight. The viscosity of 1200 ppm aqueous solutions of the polymer was determined on a Brookfield viscometer at 25° C. in distilled water, 1% NaCl solution, and synthetic sea water, with results being as follows:

|  | Viscosity (cps) | |
| --- | --- | --- |
|  | 10 sec$^{-1}$ | 70 sec$^{-1}$ |
| Distilled Water | 2.3 | 2.0 |
| 1% NaCl Solution | 1.4 | 1.2 |
| Sea Water | 1.5 | 1.2 |

The polymer from Example 1 was subjected to a microbiological screen using five strains of bacteria capable of growing aerobically and/or anaerobically. The strains that were used are indicated in Table I.

TABLE I

| Organism | Isolation Site |
| --- | --- |
| Bacillus sp. | Produced water |
| Enterobacter sp. | Produced water |
| Pseudomonas sp. (I) | Polymer contaminant |
| Pseudomonas sp. (II) | Polymer contaminant |
| Pseudomonas sp. (III) | Produced water |

The organisms Bacillus sp., Enterobacter sp., and Pseudomonas sp. (III) were isolated from an oil field. The other two organisms were laboratory isolated bacteria known to grow on water-soluble polymers. Bacillus sp. was gram positive while the others were gram negative. All strains were grown aerobically in nutrient broth at 30° C. for 24 hours. After incubation, the bacteria were washed three times by centrifugation (5,000×g, 5° C., 10 min.) with sterile distilled water. The washed cells were resuspended in minimal sterile distilled water. Cell counts were done on each cell suspension using a Petroff-Housser counting chamber.

Media were prepared for these experiments in two parts. Polymer solutions were made in distilled water at concentrations of 2400 ppm and pH 7.0. All solutions were stirred for 24 hours, weighed before sterilized, and then autoclaved (sterilized) for one hour at 121° C. and 15 psi. All water lost due to autoclaving was returned by adding sterile distilled water until the polymer solutions reached their original weight.

Basal salts medium containing 0.12% yeast extract, 0.2% $KH_2PO_4$, 0.2% $K_2HPO_4$, 0.1% $(NH_4)_2SO_4$, and 0.01% $CaCl_2H_2O$ in distilled water at pH 7.0. The $CaCl_2$ was prepared as a separate stock solution and added to the salts solution after both were sterilized and cooled to room temperature. The different polymer media for these experiments were made by aseptically mixing 1:1 (by volume) solutions of basal salts medium and 2400 ppm polymer solution.

Fifty ml. aliquots of polymer media were aseptically transferred to clear, sterile 150 ml. erlenmeyer flasks. Each flask (except controls) was inocculated to a concentration of $10^3$ bacteria/ml. with the appropriate cell suspension. Controls were inocculated with equivalent volumes of sterile distilled water. All flasks were incubated at 30° C. for two weeks. Aerobic incubation included rotary shaking of the flasks at 200 rpm. Anaerobic incubation was carried out in an anaerobic chamber system. Controls were incubated aerobically. Optical observations for turbidity of the incubated samples was used to determine "growth" and "no growth" of the bacteria. The test results are indicated in Table II. The data clearly indicates that the polymeric products of the invention do not support bacterial growth. The test results for the controls, however, indicate that the microorganisms tested can grow on unmodified polyacrylamide and partially hydrolyzed polyacrylamide.

TABLE II

| Organisms | Cond. | Control* No. 1 | Control** No. 2 | Product of Example 1 |
|---|---|---|---|---|
| Control (none) | A | — | — | — |
| Control (none) | AN | — | — | — |
| Enterobacter sp. | A | + | + | — |
| Enterobacter sp. | AN | + | + | — |
| Bacillus sp. | A | + | + | — |
| Bacillus sp. | AN | + | + | — |
| Pseudomonas sp. (II) | A | + | + | — |
| Pseudomonas sp. (II) | AN | + | + | — |
| Pseudomonas sp. (III) | A | + | + | — |
| Pseudomonas sp. (III) | AN | + | + | — |
| Pseudomonas sp. (I) | A | + | + | — |
| Pseudomonas sp. (I) | AN | + | + | — |

Key: A = aerobic; AN = anaerobic; + = bacterial growth detected; — = bacterial growth not detected.
*Unhydrolyzed polyacrylamide having a molecular weight of $3.5 \times 10^6$.
**Dow Pusher 500, a product of Dow Chemical identified as a partially carboxylated polyacrylamide.

The method of the present invention may be carried out utilizing injection and production systems as defined by any suitable arrangement of wells. One well arrangement commonly used in waterflooding operations and suitable for use in carrying out the method of the present invention is an integrated five-spot pattern of the type illustrated in U.S. Pat. No. 3,927,716 which is incorporated herein by reference. Other well arrangements may be used in carrying out the present invention, examples of some of which are also disclosed in the foregoing U.S. Pat. No. 3,927,716.

The term "pore volume" is used herein to mean that volume of the portion of the formation underlying the well pattern employed, as described in greater detail in the U.S. Pat. No. 3,927,716.

In a preferred embodiment of the invention, an aqueous composition containing a minor thickening amount of the bioresistant polymer of the invention is injected into a subterranean formation through one or more injection wells to drive the oil in the formation toward one or more production wells. The injection of such aqueous composition and the recovery of oil from the production wells can be accomplished using standard techniques well known to those skilled in the art. The concentration of polymeric thickener in such aqueous composition is preferably from about 0.05% to about 0.2% by weight, more preferably about from 0.05% to about 0.1% by weight. Preferably, the concentration of thickener in such aqueous composition is sufficient to provide the aqueous composition with a viscosity of about equal to or greater than the viscosity of the oil in the reservoir. The injected aqueous composition preferably has a pore volume of about 0.6 to about 3 or higher.

In another preferred embodiment, a surfactant slug, buffer slug and aqueous flooding medium are injected into the subterranean formation in sequential order through one or more injectable wells to drive the oil in the formation toward one or more production wells. Again the injection and recovery techniques are standard techniques well known to those skilled in the art. The surfactant slug is an aqueous system containing preferably about 0.001% to about 5% by weight, more preferably about 0.1% to about 1% by weight of a suitable surfactant, and, optionally, about 0.05% to about 0.2% by weight, preferably about 0.05% to about 0.1% by weight of the thickener of the invention. The size of the surfactant slug preferably ranges from about 0.2 to about 3 pore volumes.

The concentration of surfactant in the surfactant slug is preferably adjusted in accordance with the size of the slug. A surfactant slug with a pore volume of about 0.2 preferably has a surfactant concentration of about 1 to about 2% by weight. A surfactant slug with a pore volume of about 1 preferably has a surfactant concentration of about 0.1 to about 1% by weight. A surfactant slug with a pore volume of about 2 preferably has a surfactant concentration of about 0.05 to about 0.5% by weight.

The surfactant preferably is selected from among those surfactants having a high tolerance to high levels of aqueous phase salinity as well as divalent and trivalent metal ions such as calcium, magnesium, boron, barium, iron an the like to permit the use of the water employed to be a high salinity brine such as sea water. Examples of surfactants that can be used under various advantageous conditions include the petroleum sulfonates; nonionic surfactants, such as polyethoxylated alkyl phenols, polyethoxylated aliphatic alcohols, carboxylic esters, carboxylic amides, and polyoxyethylene fatty acid amides; combinations of anionic and nonionic surfactants such as alkyl or alkylaryl sulfonates or phosphates and polyethoxylated alkyl phenols or sulfates; cationic surfactants such as quaternary ammonium salts, and derivatives of fatty amines and polyamines; and amphoteric surfactants such as the quaternary ammonium sulfonates and carboxylates and the sulfonium sulfonates. Many such surfactants are known in the art. See, for example, "Chemicals for Oil Field Operations, Recent Developments", Edited by J. I. DiStasio, Noyes Data Corporation, Park Ridge, N.J. (1981) at pages 156–197 which along with the patents cited therein are incorporated herein by reference.

The buffer slug comprises an aqueous composition containing the polymeric thickener of the invention. It preferably has a thickener concentration of about 0.05% to about 0.2% by weight, more preferably about 0.05 to about 0.1% by weight. Preferably, the concentration of such thickener in the buffer slug is at least about 0.02% by weight higher than the concentration of thickener, if any, in the surfactant slug. The higher concentration of thickener in the buffer slug in relation to the concentration of thickener, if any, in the surfactant slug is essential to insure proper control of the relative mobilities of the surfactant slug and the buffer slug. The buffer slug preferably has a pore volume in the range of about 0.6 to about 3.

The drive fluid or aqueous flooding medium is injected into the reservoir in sequential order after the surfactant slug and buffer slug. This flooding medium is preferably water and can be any source of water, such as sea water, that is readily available.

An advantage of the present invention is that because of the superior properties of the bioresistant polymers of the invention, the inventive method can be practiced in subterranean formations having relatively high temperatures and high pressures, and can employ floodwaters characterized by high salinities, high concentrations of divalent and trivalent metal ions, and either high or low pH. These conditions are encountered under various circumstances at Prudhoe Bay, the North Sea, the Persian Gulf, the Gulf of Mexico, as well as other major oil fields.

The bioresistant polymers of the invention provide the advantage that the addition of biocide additives for preventing the deterioration of the polymer are not required, thus problems inherent with the use of such biocide additives such as plugging of the well and separation of the polymer and additive can be avoided. Examples of biocide additives for which the use thereof can be avoided in the process of the invention include formaldehyde and glutaraldehyde. The patent literature suggests other biocide additives, and the use of these can also be avoided with the process of the invention. For example, U.S. Pat. Nos. 2,205,558, 3,394,195, and 3,407,204 disclose the use of maleimides; U.S. Pat. No. 3,562,157 discloses the use of malealdehyde; and U.S. Pat. No. 4,049,559 discloses the use of certain di-bicyclo or heptyl or di-bicyclo and heptenyl polyamines. These patents are incorporated herein by reference for their disclosure of biocide additives for which the use thereof can be avoided in the process of the present invention.

While the invention has been explained in relation to its preferred embodiments, it is to be understood that various modifications thereof will become apparent to those skilled in the art upon reading this specification. Therefore, it is to be understood that the invention disclosed herein is intended to cover such modifications as fall within the scope of the appended claims.

We claim:

1. A method for recovering oil from a subterranean formation comprising injecting into said formation an aqueous composition comprising a thickening amount of a polymeric thickener represented by the formula

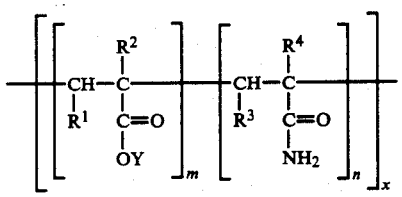

wherein
Y is hydrogen, ammonium, an alkali metal or an alkaline earth metal,
$R^1$ and $R^3$ are hydrogen;
$R^2$ is an alkyl group of 2 to about 3 carbon atoms, and $R^4$ is hydrogen;
m is a number sufficient to provide the acid or salt portion of said polymer at a level of from about 10% to about 90% by weight of the total weight of said polymer,
n is a number sufficient to provide the amide portion of said polymer at a level of from about 10% to about 90% by weight of the total weight of said polymer, and
x is a number sufficient to provide said polymer with a molecular weight of at least about 100,000.

2. The method of claim 1 wherein said aqueous composition comprises a buffer slug, said method further comprising the steps of:
injecting into said formation a surfactant slug to precede said buffer slug, said surfactant slug comprising an aqueous solution containing an effective amount of a surface-active agent to reduce the oil-water interfacial tension and/or alter the wettability characteristics of the rock in said formation, and
injecting into said formation an aqueous flooding medium to follow said buffer slug.

3. The method of claim 1 wherein said polymeric thickener is present in said aqueous composition at a concentration in the range of about 0.05 to about 0.2% by weight.

4. The method of claim 1 wherein the average temperature of the oil in said formation is in the range of about 15° C. to about 120° C.

5. The method of claim 1 wherein the water in said aqueous composition has a TDS of up to about 200,000 ppm.

6. The method of claim 1 wherein said aqueous composition has a divalent or trivalent metal ion concentration of up to about 20,000 ppm.

7. The method of claim 1 wherein the pH of said aqueous composition is in the range of about 4 to about 12.

8. The method of claim 1 wherein the water in said aqueous composition is sea water.

9. The method of claim 1 wherein the pressure within said formation ranges up to about 4000 psi.

10. The method of claim 2 wherein the amount of said surfactant slug injected into said formation is equal to about 0.2 to about 3 pore volumes.

11. The method of claim 2 wherein the amount of said buffer slug injected into said formation is equal to about 0.6 to about 3 pore volumes.

12. The method of claim 2 wherein said surfactant slug contains a thickening amount of the polymeric thickener in said buffer slug, the amount of said thickener in said buffer slug exceeding the amount of said thickener in said surfactant slug by at least about 0.02% by weight.

13. The method of claim 1 wherein Y is an alkali metal.

14. The method of claim 1 wherein Y is sodium.

15. The method of claim 1 wherein m is a number sufficient to provide the acid or salt portion of said polymeric thickener at a level of from about 10% to about 50% by weight of the total weight of said polymeric thickener.

16. The method of claim 1 wherein n is a number sufficient to provide the amide portion of said polymeric thickener at a level of from about 50% to about 90% by weight of the total weight of said polymeric thickener.

17. The method of claim 1 wherein m is a number sufficient to provide the acid or salt portion of said polymeric thickener at a level of about 30% by weight of the total weight of said polymeric thickener.

18. The method of claim 1 wherein n is a number sufficient to provide the amide portion of said polymeric thickener at a level of about 70% by weight of the total weight of said polymeric thickener.

19. The method of claim 1 wherein the amide portion of said polymeric thickener is derived from methacrylamide.

20. The method of claim 1 wherein x is a number sufficient to provide said polymer thickener with a molecular weight of at least about 1,000,000.

21. The method of claim 1 wherein said aqueous composition is characterized by the absence of a biocide additive.

* * * * *